US008923995B2

(12) United States Patent
Lindahl et al.

(10) Patent No.: US 8,923,995 B2
(45) Date of Patent: Dec. 30, 2014

(54) DIRECTIONAL AUDIO INTERFACE FOR PORTABLE MEDIA DEVICE

(75) Inventors: Aram Lindahl, Menlo Park, CA (US); Richard Powell, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 890 days.

(21) Appl. No.: 12/645,051

(22) Filed: Dec. 22, 2009

(65) Prior Publication Data

US 2011/0153044 A1    Jun. 23, 2011

(51) Int. Cl.
| | | |
|---|---|---|
| G06F 17/00 | (2006.01) | |
| G06F 3/01 | (2006.01) | |
| H04S 7/00 | (2006.01) | |
| G06F 3/16 | (2006.01) | |
| G06F 3/0346 | (2013.01) | |
| G06F 3/0482 | (2013.01) | |
| H04R 5/033 | (2006.01) | |
| H04R 1/10 | (2006.01) | |

(52) U.S. Cl.
CPC ............... *G06F 3/011* (2013.01); *G06F 3/017* (2013.01); *H04S 7/304* (2013.01); *H04R 5/033* (2013.01); *G06F 3/167* (2013.01); *H04R 2420/07* (2013.01); *H04R 1/1041* (2013.01); *G06F 3/0346* (2013.01); *G06F 3/0482* (2013.01)
USPC .......................................................... 700/94

(58) Field of Classification Search
CPC ....... G06F 3/167; G06F 3/017; G06F 3/0346; G06F 2200/1637; H04S 2400/11; H04S 1/002; H04S 1/005; H04S 2420/01; H04S 3/002; H04S 3/004
USPC ............ 700/94; 381/17, 18, 21, 61, 119, 307, 381/309, 310
See application file for complete search history.

(56) References Cited

U.S. PATENT DOCUMENTS

| | | | |
|---|---|---|---|
| 6,011,851 A * | 1/2000 | Connor et al. | 381/17 |
| 7,190,794 B2 | 3/2007 | Hinde | |
| 7,433,479 B2 * | 10/2008 | Sato | 381/309 |
| 7,596,765 B2 | 9/2009 | Almas | |
| 2003/0018477 A1* | 1/2003 | Hinde | 704/273 |
| 2005/0045373 A1 | 3/2005 | Born | |
| 2006/0251263 A1* | 11/2006 | Vronay | 381/17 |
| 2007/0021961 A1* | 1/2007 | Oh | 704/273 |
| 2008/0134102 A1 | 6/2008 | Movold et al. | |
| 2008/0262847 A1 | 10/2008 | Agapi et al. | |
| 2009/0088204 A1 | 4/2009 | Culbert et al. | |
| 2009/0138507 A1 | 5/2009 | Burckart et al. | |

(Continued)

OTHER PUBLICATIONS

3D Interactive Environment for Music Collection Navigation; Stewart et al. Sep. 1-4, 2008.*

(Continued)

*Primary Examiner* — Andrew C Flanders
(74) *Attorney, Agent, or Firm* — Fish & Richardson P.C.

(57) ABSTRACT

Methods and apparatus for a user to interact with and control a portable media device through an audio user interface. The audio user interface includes one or more audible control nodes perceived by the user to be spatially located at different points about the user of the portable media device. A sensor in the portable media device senses a movement of the portable media device by the user toward one or more of the audible control nodes. The operation of the portable device is modified in accordance with the sensed movement of the portable media device.

20 Claims, 11 Drawing Sheets

(56) References Cited

U.S. PATENT DOCUMENTS

2009/0252311 A1* 10/2009 Kuiken .................... 379/102.02
2011/0153043 A1*  6/2011 Ojala ............................. 700/94
2011/0208331 A1*  8/2011 Sandler et al. .................. 700/94

OTHER PUBLICATIONS

Hipui website, http://www.hipui.com/wp/funkyplayer/ downloaded Dec. 8, 2009.

Keshavarz et al., "Sound Localization-Based Navigational User Interfaces," Proceedings of the Eighth IEEE International Symposium on Multimedia (ISM '06), 2006.

Kobayashi et al., "Dynamic Soundscape: mapping time to space for audio browsing," CIII 97, Atlanta, GA, Mar. 22-27, 1997, pp. 194-201.

* cited by examiner

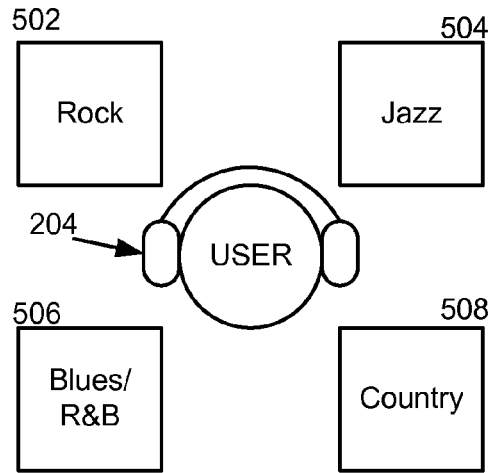
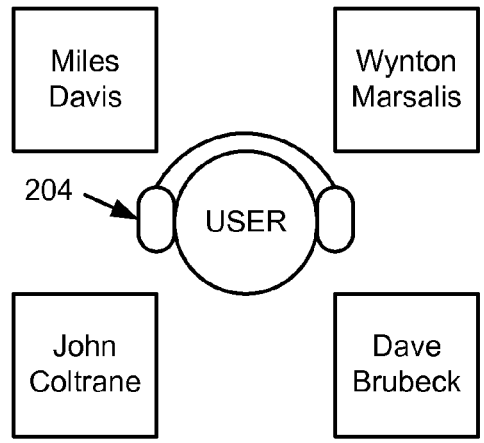
FIG 5A  FIG 5B
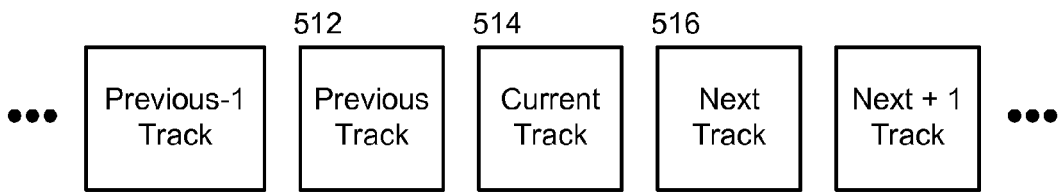
FIG 5C

DIRECTIONAL AUDIO INTERFACE FOR PORTABLE MEDIA DEVICE

TECHNICAL FIELD

The present invention relates generally to audio interfaces for portable media devices. More particularly, a method and an apparatus are described for interfacing with and controlling a portable media device through a directional audio interface.

BACKGROUND OF THE INVENTION

The increased density and lower cost per Mbyte of storage media, initially with hard disk storage and continuing with flash memory, has resulted in a multitude of portable media devices capable of conveniently storing and enabling retrieval of audio, image, video and multimedia (e.g. game) files. With their small size and portability, portable media devices can be used during a variety of activities, for example while reading, walking, running, biking and driving. While engaged in these activities, the user can be "visually" focused on the activity and simultaneously "aurally" connected with the portable media device. Interacting with the device without using a visual interface can be accomplished with limited functionality on today's devices, such as by depressing a simple on/off button and operating a volume control on a headset connected by a wire or wirelessly to the device. More complex interactions with the device, such as searching for and selecting a particular stored media file can require the user to disengage visually from the current activity to use a displayed graphical user interface on the device. The graphical user interface can include control inputs, e.g. a touch screen, touch pad or a scroll wheel button by which the user can navigate through the stored media libraries on the device. Using the graphical user interface, however, can disrupt the activity in which the user is otherwise visually engaged, and some portable media devices do not include a visual display. Thus there exists a need for an alternative user interface that enables the user to interact with and control the portable media device to navigate through and retrieve from a set of media stored in the device.

SUMMARY OF THE DESCRIBED EMBODIMENTS

This paper describes various embodiments that relate to systems, methods and apparatus that enable a user to interact with a portable media device through an audio user interface. In described embodiments, the audio user interface can include one or more audible control nodes perceived to be spatially located at different points about the user of the portable media device. A sensor in the portable media device can sense a movement of the portable media device by the user toward one or more of the audible control nodes. The operation of the portable device can be modified in accordance with the sensed movement of the portable media device.

In one embodiment, a method for controlling a portable device by a user is disclosed. In the described embodiment, the portable device includes at least a processor and a sensor. The method can be carried out by performing at least the following operations. Receiving a directional audio signal by the user, the directional audio signal being generated by the portable device. In response to receiving the directional audio signal, the user moves the portable device, the movement being sensed by the sensor. An operation of the portable media device is then modified based upon the sensed movement.

In another embodiment, a portable device arranged to provide an audio user interface to a user of the portable device is disclosed. The portable device includes at least a processor configured to generate a directional audio signal, an audio output circuit configured to communicate the directional audio signal to the user of the portable device, and a sensor configured to sense a movement of the portable device generated by the user in response to the directional audio signal. In the described embodiment, an operation of the portable device is modified in accordance with the sensed movement.

In still another embodiment, an audio user interface suitable for assisting a user in controlling an electronic device is described. The audio user interface being perceived by the user to include one or more audible control nodes each spatially located at different points about the user. In the described embodiment, the portable device is controlled by the user moving the portable device in the perceived direction of a selected one of the audible control nodes.

In yet another embodiment, a method of providing to a user an audio user interface in a portable device is described. The method includes at least the following steps. A processor in the portable device generates a directional audio signal having a direction cue and communicates the directional audio signal to the user of the portable device through an audio output circuit. A sensor in the portable device senses a movement of the portable device effected by the user in response to receiving the communicated directional audio signal. The processor associates the sensed movement of the portable device with a specific operational change of the portable device. In some embodiments of the method, the sensor in the portable device is arranged to detect at least a change in position, an orientation change and an acceleration of the portable device.

A method for updating an audio user interface of a portable device that has a processor and a directional audio interface is described. The method can be carried out by performing at least the following operations. Transmitting a directional audio menu including at least one menu item selection to a user of the portable device, sensing a movement of the portable device in response to the transmitted directional audio menu, identifying a menu item selection of the directional audio menu based on the sensed movement, and associating the identified menu item selection in the directional audio menu with the sensed movement.

BRIEF DESCRIPTION OF THE DRAWINGS

The invention and the advantages thereof may best be understood by reference to the following description taken in conjunction with the accompanying drawings.

FIGS. 5A and 5B illustrate two sets of menu items of an audio user interface presented at spatially distinct locations with respect to a user (back view).

FIG. 5C illustrates a horizontal set of menu items that can be selected through an audio user interface of a portable media device.

DETAILED DESCRIPTION OF EXAMPLE EMBODIMENTS

Figure 1A:
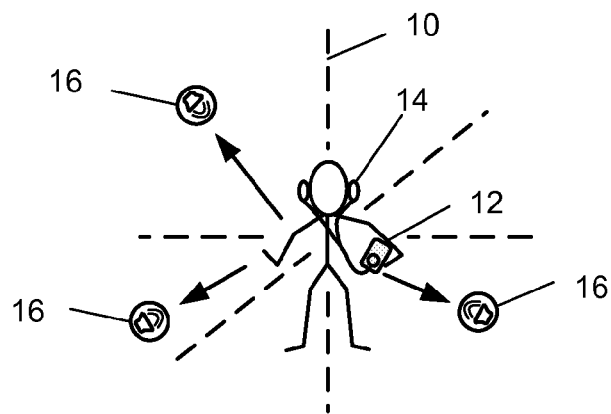
FIG. 1A illustrates a set of audible control nodes arrayed spatially around a user of a portable media device.

The present invention relates generally to audio interfaces for portable media devices. More particularly, a method and an apparatus are described for interfacing with and controlling a portable media device through a directional audio interface.

In the following description, numerous specific details are set forth to provide a thorough understanding of the present invention. It will be apparent, however, to one skilled in the art that the present invention may be practiced without some or all of these specific details. In other instances, well known process steps have not been described in detail in order to avoid unnecessarily obscuring the present invention.

Portable media devices today can store a vast array of information, including audio, video, image and multimedia files. Navigating through the stored information on a portable media device can require using a graphical user interface presented on an accompanying visual display of the device. With storage capability increasing in a multitude of portable media devices and with decreasing physical dimensions of the devices, there exists a need for a user interface to portable media devices that does not require using a visual display. In some cases, the portable media device can omit a visual display and offer limited input controls. Even if a display is included, many portable media devices can be operated while the user engages in activities during which it would be disruptive to interrupt the activity to use the visual display. Thus there exists a need for an alternative user interface that enables the user to interact with the portable media device to search and retrieve information stored therein.

As many portable media devices include audio output capabilities, an audio user interface can provide the user an alternative method by which to search, review and access information stored in the device. An audio output capability and appropriate audio processing in the device can present the user an array of sounds by which the user can aurally navigate the information stored in the device. With binaural output to a user through a stereo headset, the portable media device can reproduce sounds that are spatially distinct, enabling the user to distinguish different stored information files based on an "aurally" presented location. The portable media device can include a control input with which the user can indicate a specific operational change, such as selecting a stored file for playback. In addition the portable media device can include a sensor that can detect a change in position, orientation or acceleration of the device. By moving the device using a variety of gestures, the user can also explore and select among the stored information files, as well as alter the playback of those files. The combination of a motion sensor, a computational processor capable of audio processing and an audio output unit in a portable media device can provide the user with an audio user interface for accessing media that supplements or replaces a visual user interface on that device.

FIG. 1A illustrates a user positioned in a three dimensional reference coordinate system 10 listening to portable media device 12 through headset 14. Portable media device 12 can create an audio user interface through which the user can control portable media device 12. In one embodiment, the audio user interface can include one or more audible control nodes 16 perceived to be spatially located at different points about the user. Portable media device 12 can transmit audio to the user through headset 14 so that each audible control node 16 can appear to reproduce a particular sound, word, phrase or audio segment emanating from a distinct location. Binaural audio processing in portable media device 12 can produce representative spatial sounds. The user can move portable media device 12 in response to hearing the audio user interface in order to alter an operation of the portable media device 12. For example, moving portable media device 12 in the direction of one of the audio control nodes 16 (or executing some other translational or rotational movement) can result in portable media device 12 changing volume of a media item being played. More broadly, portable media device 12 can sense a movement and associate the sensed movement with a specific operational change that can modify a specific operation of portable media device 12.

Figure 1B:
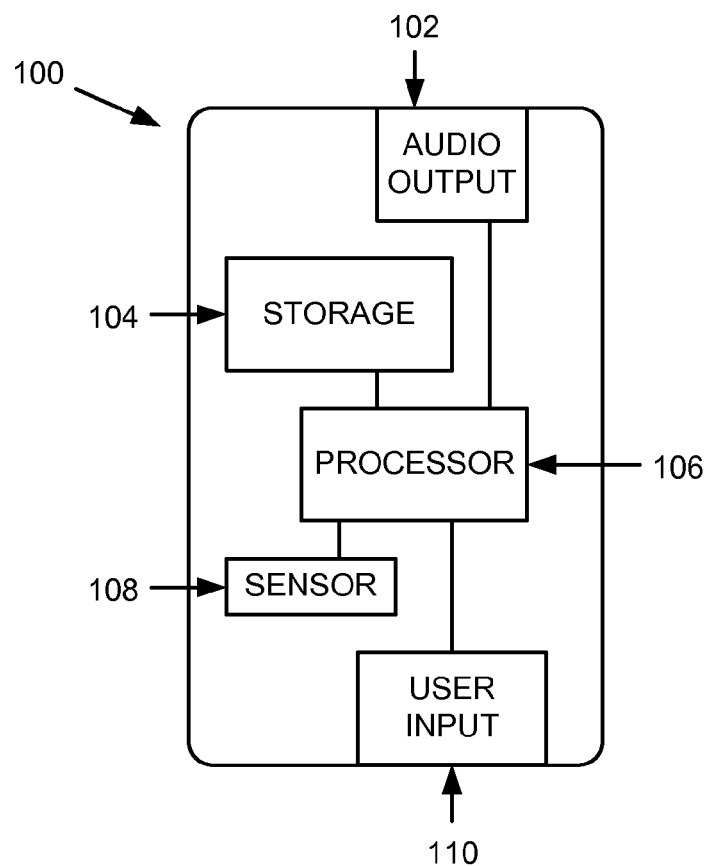
FIG. 1B illustrates a portable media device comprising several interconnected processing, sensing, storage and input/output units.

FIG. 1B illustrates portable media device 100 in accordance with the described embodiments. As shown, portable media device 100 can include audio output circuit 102, data storage device 104, processor 106, sensor 108, and user input interface 110. It should be noted that even though only a limited set of components are shown this does not imply a limitation on the functional components that can be included in portable media device 100. For example, in addition to the components shown in FIG. 1, embodiments of portable media device 100 can also include a power connector, a data transfer component, a display and a wireless telecommunications interface.

Storage unit 104 can store data that can include media data in the form of, for example, audio, image, video and multimedia data files. The stored data files can be encoded either before or after being stored using a variety of compression algorithms. For example, audio data can be compressed using MP3, AAC and Apple Lossless compression protocols whereas images can be compressed using, JPEG, TIFF and PNG compression. Moreover, video can be compressed using H.264, MPEG-2 and MPEG-4 and so on. The stored media contained in the storage unit 104 can be accessed by a processor unit 106 that can search and retrieve the stored media for reproduction to a user of portable media device 100. Audio information in the stored files can be presented through an audio output circuit 102 to the user. Currently, the size of a storage unit 104 in a representative portable media device 100 can range from several Gbytes, which is large enough to store approximately 1000 audio files using current audio compression algorithms, to nearly 200 Gbytes, which is sufficient to store several hundred compressed video files. It is expected that storage capacities will continue to increase and compression algorithms to become more efficient, resulting in higher capacity devices with medium to small form factors. Many of these portable media devices can have limited or no visual display capabilities by which to navigate the stored media. A user of portable media device 100 can require a simple but capable interface by which to search for, sort through, sample and choose a particular media file or portion thereof for playback.

Interaction between portable media device 100 and a user through an audio user interface can be effected using the audio output circuit 102 to communicate information to the user. At the same time a user input interface 110 or a sensor 108 (or both) in portable media device 100 can receive commands from the user. In one operational mode, the processor 106 can present a set of menu items among which the user can select. The set of menu items can be presented simultaneously or sequentially to the user, each menu item having a distinguishable audio characteristic. In particular, the processor 106 can alter characteristics of the audio to appear to aurally emanate from different physical locations. The user can select among the menu items by altering the position, orientation or motion of portable media device 100, the alteration being sensed by the sensor 108. The user can also input commands through the user input interface 110 by, for example, pressing a button or gesturing on a touch sensitive surface. In response to sensed motions or input commands received from the user, the processor unit 106 can subsequently retrieve selections of the stored media and present them to the user. The sensor 108 can include at least the following an accelerometer.

Figure 2A:
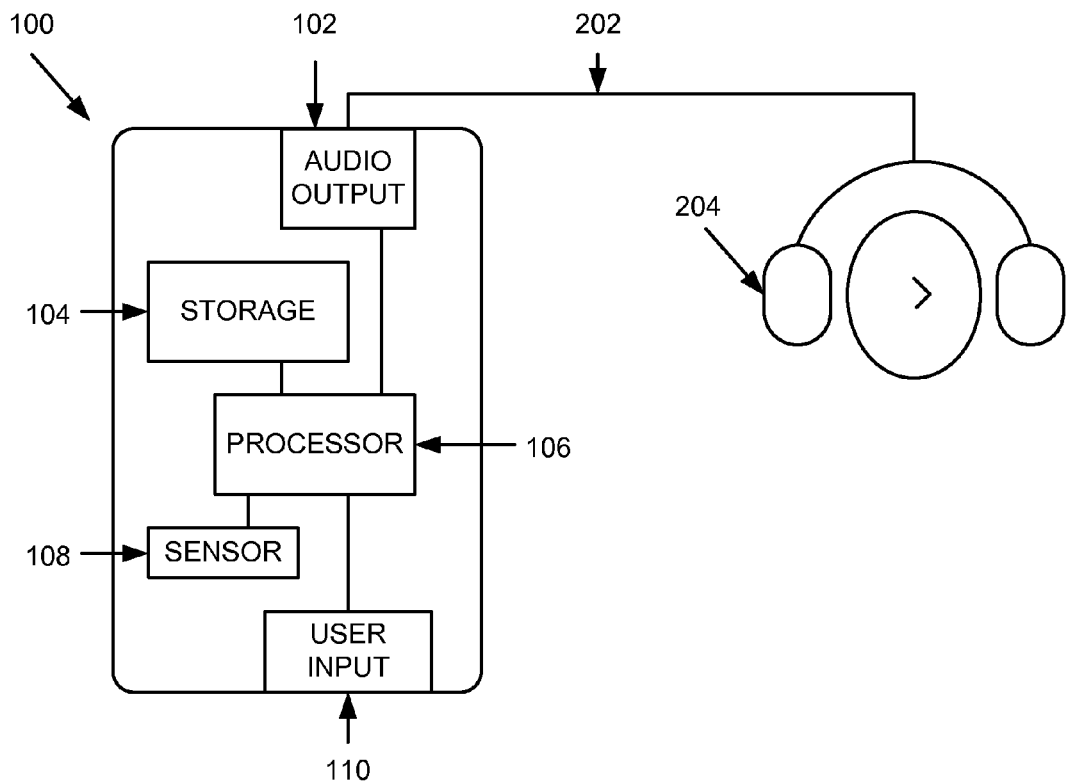
FIG. 2A illustrates the portable media device of FIG. 1 linked by a wired connection to a user headset.
Figure 2B:
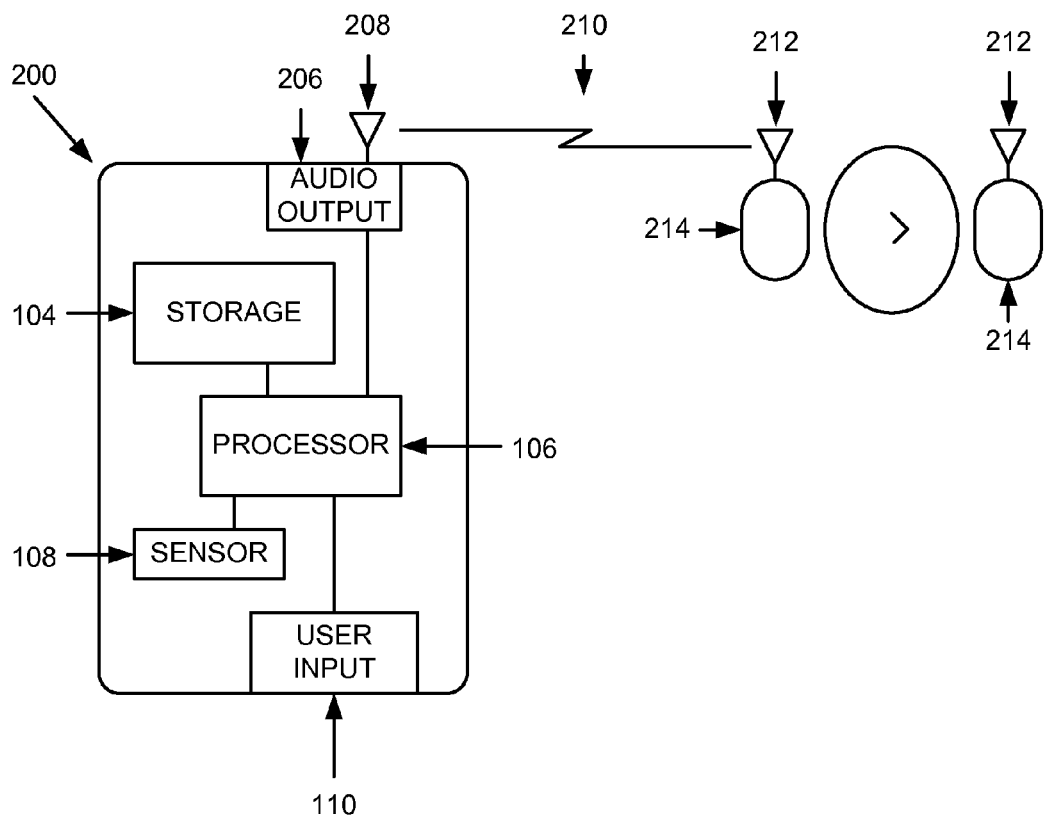
FIG. 2B illustrates the portable media device of FIG. 1 linked by a wireless connection to a wireless capable user headset.

FIGS. 2A and 2B illustrate a portable media device 100 connected to a user. In FIG. 2A the audio output circuit 102 can connect through a physical wire 202 to a stereo head set 204 on the user. In FIG. 2B the audio output interface 206 can convert an audio signal from the processor 106 to an RF signal to communicate through an antenna 208 over a wireless connection 210 to a stereo headset pair 214 that includes antennas 212. A stereo audio signal reproduced by stereo headsets can provide an excellent simulation of a three dimensional space, where sounds can emanate from all directions around the user. Thus the processor 106 can transmit a set of tags and/or segments of audio from the stored media as a set of menu items altered by audio processing to appear to be located at particular locations with respect to the user. The user can move portable media device 100 to select one of the transmitted menu items, and the processor 106 can detect the movement through the sensor 108. In some embodiments, the processor 106 can acknowledge the menu item selection to the user by communicating the selected menu item again. The user in response can confirm the menu item selection through the control input 110.

Figure 3A:
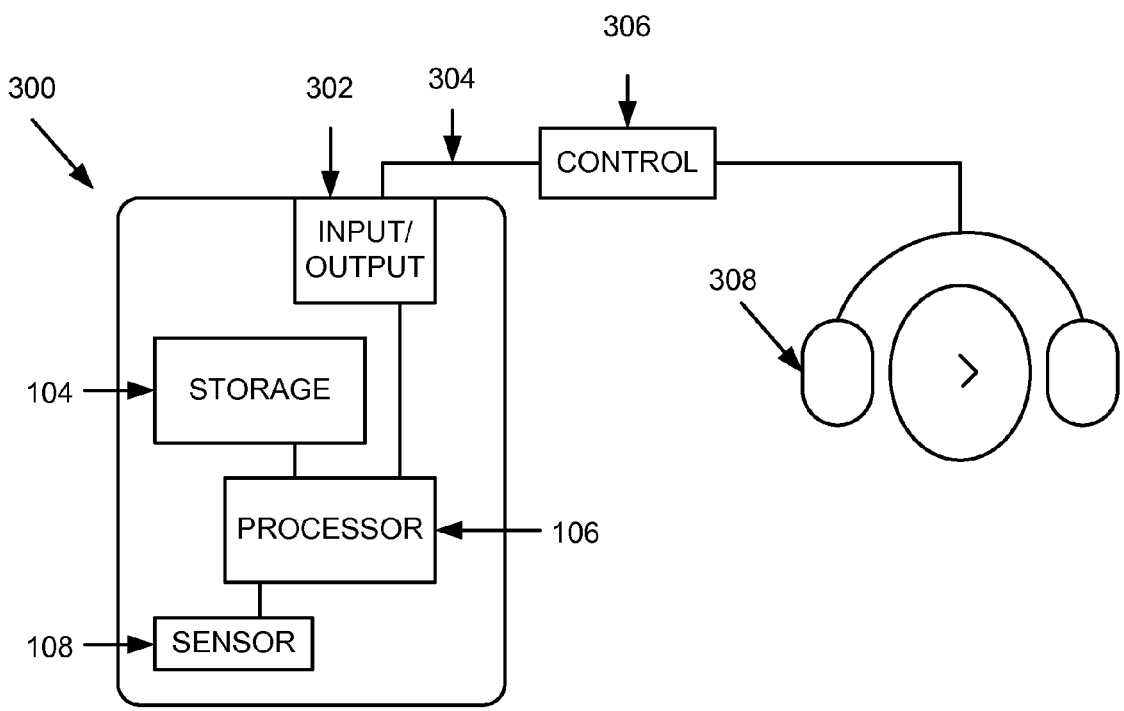
FIG. 3A illustrates a variant of the portable media device and user headset of FIG. 2A including a control input along the wired connection.
Figure 3B:
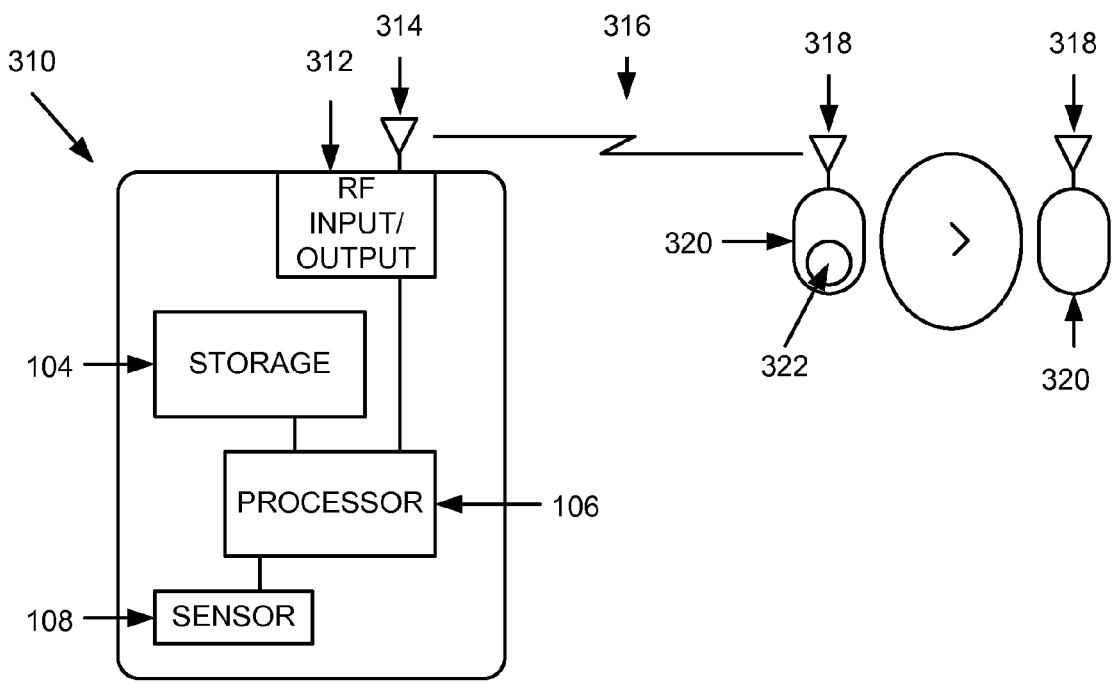
FIG. 3B illustrates a variant of the portable media device and wireless capable user headset of FIG. 2B including a control input in the wireless user headset.

While FIGS. 2A and 2B illustrate the control input 110 as part of portable media device 100, FIGS. 3A and 3B illustrate that a control input can also be located as part of a stereo headset connected to a portable media device. In FIG. 3A, an input/output interface 302 on a portable media device 300 can connect to a headset 308 through a wired connection 304. A control input 306 can be part of the wired connection 304 between the device 300 and the user as shown. (While not shown, the control can alternatively be part of the headset 308). In FIG. 3B, a portable media device 310 can connect to a headset 320 through an RF input/output interface 312 by a wireless connection 316 between antennas 314/318. A control interface 322 can be located on the headset 320. Thus the sensor 108 can be integrated in portable media device 100/200/300/310 in order to detect a change in the device position, orientation or motion, while control inputs 110/306/322 can be located together with or separate from an associated portable media device.

Figure 4:
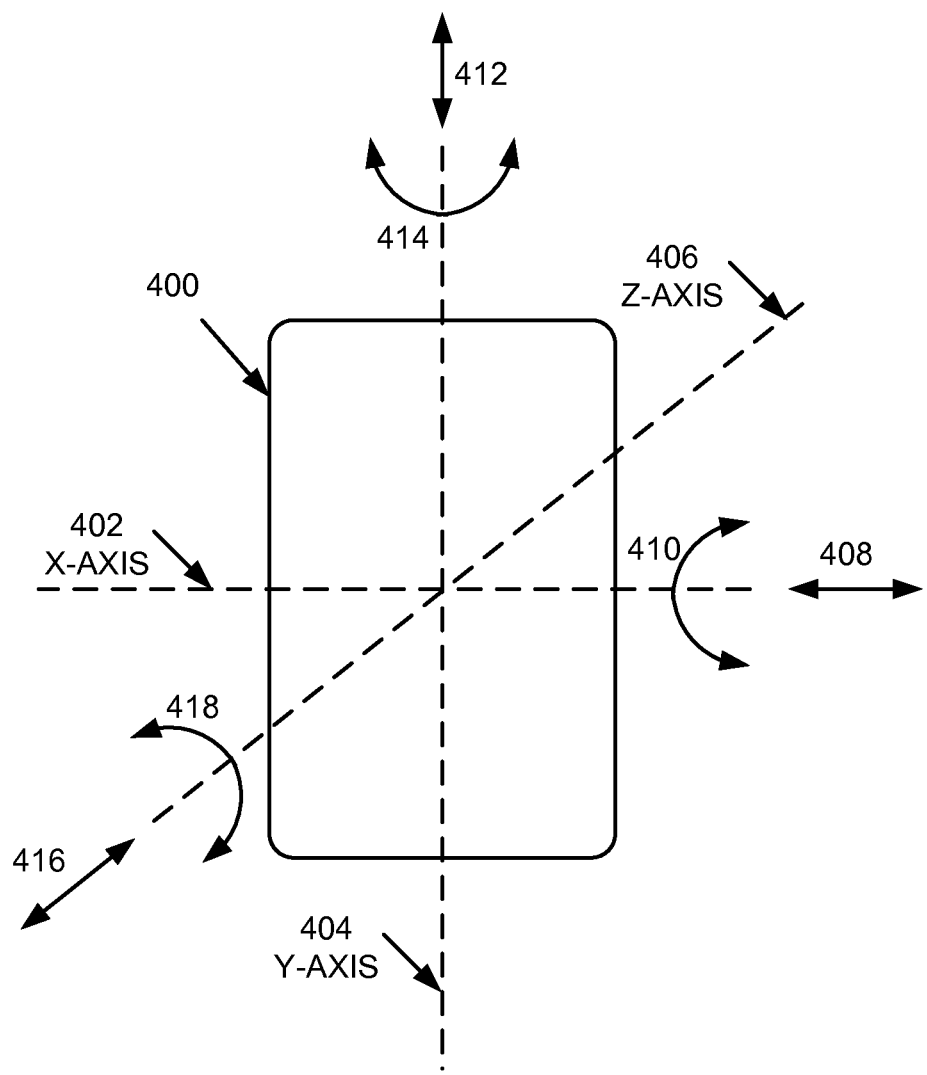
FIG. 4 illustrates six independent degrees of movement in three dimensions for a portable media device.

The sensor 108 can include, without limitation, an accelerometer, a gyroscope or another motion sensing device that can detect a change in position, orientation or movement of a portable media device 400 along a number of different reference directions as shown in FIG. 4. Typically, accelerometers can measure linear motion directly, while gyroscopes can measure angular motion directly. In some embodiments, the sensor 108 can detect a linear translational motion 416 along a z-axis 406, a linear translational motion 408 along an x-axis 402, and/or a linear translational motion 412 along a y-axis 404. For the orientation of the portable media device 400 as shown in FIG. 4, movement along the x-axis can be associated with right/left motion, movement along the y-axis with up/down motion, and movement along the z-axis with front/back or forward/reverse motion. The sensor 108 can also detect a rotational movement about one or more of the associated axes, such as an angular rotation 410 about the x-axis 402, an angular rotation 414 about the y-axis 404 and an angular rotation 418 about the z-axis 406. In certain embodiments, the sensor 108 can be limited to sense only a subset of the dimensions to lower its complexity or cost. For example the portable media device 400 can include a sensor 108 that senses translational motion along the x-axis 402 and the y-axis 404, while ignoring motion along the z-axis 406. Movement along an axis, whether translational or rotational, can be associated with traversing a set of menu item selections presented to the user of the portable media device 400 as will be discussed in detail below.

The storage unit 104 in portable media device 100 in FIG. 1 can contain a database of stored media, and each of the stored files in the storage unit 104 can be identified using a variety of tags. Example tags include file type (audio, video, photo, etc.), genre type (rock, jazz, classical, etc.), date/time (recorded, stored, last retrieved, etc.), size, artist, album title, track title, segment title, etc. These tags can be used to provide a search capability through the database of stored media on portable media device 100. The processor 106 in portable media device 100 can present a selection of tags as a set of menu items among which the user can choose. The set of menu items can be presented as an audio user interface to the user of portable media device 100 by communicating aurally through the audio output circuit 102.

In one embodiment, as shown in FIG. 5A, a set of menu items can be presented to a user through a headset 204 (shown in FIG. 2A). The processor 106 in portable media device 100 can spatially process the set of menu items so that each menu item appears to emanate from a distinct physical direction with respect to the user. For example as shown in FIG. 5A (back view of user) a set of four genres can be presented as an audio menu to a user with each menu item having a distinct location. The rock genre menu item 502 can appear to the upper left, the jazz genre menu item 504 to the upper right, the blues/r&b menu item 506 to the lower left and the country menu item to the lower right 508. These menu items can be presented in a variety of forms such as synthesized text-to-speech, recorded speech or samples of recorded music. In some embodiments, the menu items can be presented sequentially, such as when articulating the menu items as speech, or can be presented simultaneously, such as when communicating the menu items as samples of recorded music. (Speech can also be presented simultaneously and recorded music samples sequentially as well.) The user can move portable media device 100 in the direction of a menu item, and the sensor 108 can detect the movement. The processor 106 in portable media device 100 can determine, based on the sensed movement, the menu item indicated by the user and present a confirmation of the indicated menu item to the user, such as repeating the menu item or sample of recorded music. The user can then select the indicated menu item by a second movement of portable media device 100, for example a quick shake, or by confirming through a user input interface 110, such as depressing a physical button, on portable media device 100. In some embodiments, portable media device 100 can automatically select the indicated menu item based on the initial sensed movement without using a confirmation from a second gesture.

The selected menu item can represent a category that contains another set of menu options that can be presented similarly to the user. For example, if the user in FIG. 5A selects the "Jazz" genre menu item 504, then portable media device 100 can present a second set of menu items, each presenting a "Jazz" artist within the "Jazz" genre, as shown in FIG. 5B. The user can select one of the new menu items in a similar manner by moving portable media device 100. The combination of a movement sensor 108, a processor 106 and an audio output circuit 102 in a portable media device 100 can provide an audio user interface to a set of media in a storage unit 104 contained therein. In a browsing mode, portable media device 100 can present the user a set of menu items among which to select. These menu items can be organized hierarchically, wherein each menu item, once selected, presents a new set of menu items. While FIGS. 5A and 5B show only four menu items at a given level in the hierarchy, additional menu items can exist in parallel audibly "off stage", for example to the far left and/or far right of the user. The user can select a different set of four menu items by moving the portable media device in a specific gesture (for example flick to the left or right) which can "pan in" a new set of menu items among which to choose.

In addition to browsing the database of stored media, the user can also control playback of selected menu items through the audio user interface. In an embodiment, playback menu items can be arranged as shown in FIG. 5C. If the user is currently playing the current track 514, by moving portable media device 100 in the left or right direction, the portable media device can jump to the previous track 512 or the next track 516 respectively. In one mode, portable media device 100 can immediately begin playing an indicated menu item. In another mode, portable media device 100 can respond directly to movements by playing a segment of an album or track indicated, and the user can confirm selection of the album or track through a second gesture or through a user input interface 110.

Figure 6:
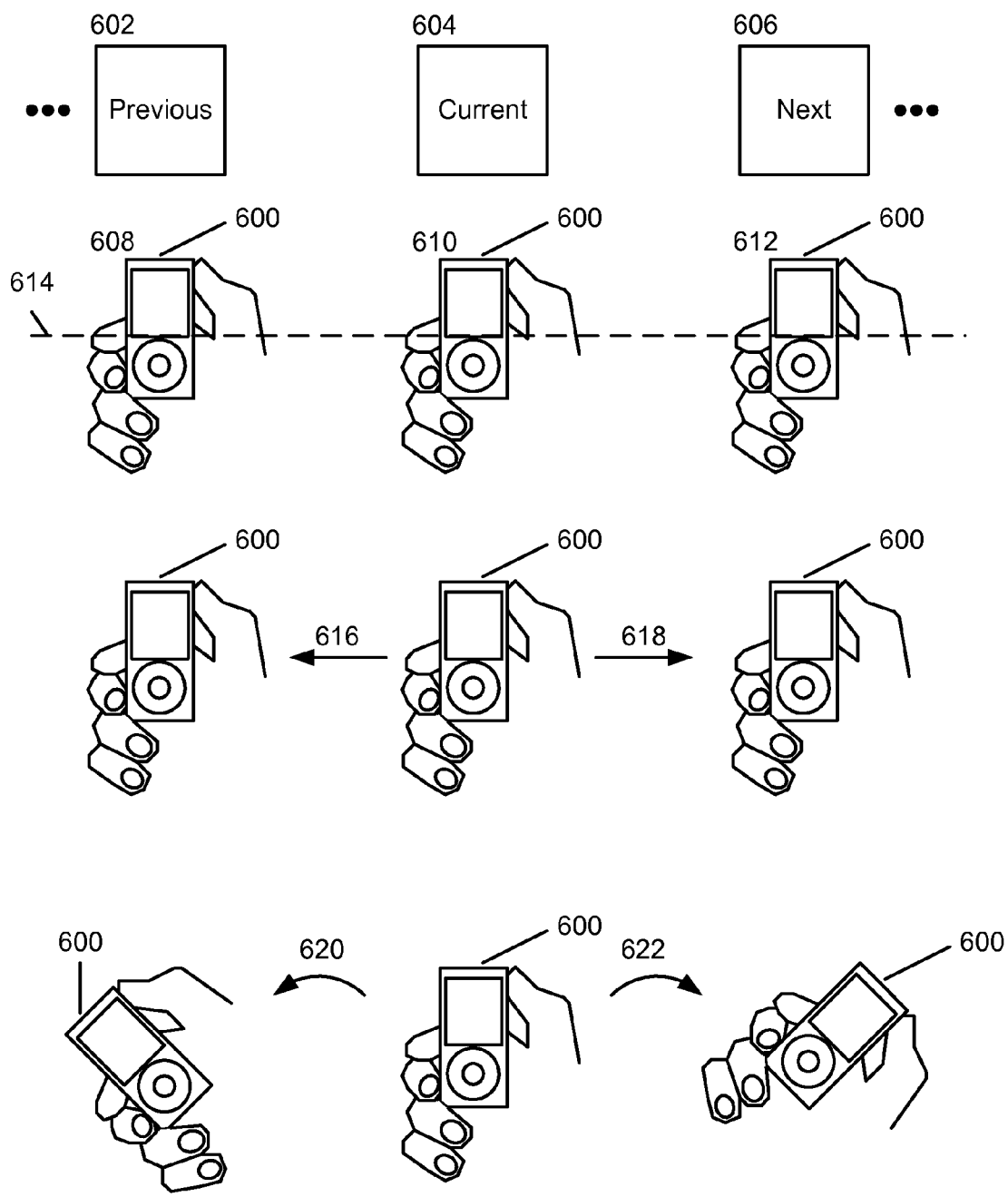
FIG. 6 illustrates different movement gestures that can be associated with selecting a menu item.

The mapping of movements/gestures to an intended selection can be "many to one," i.e. several different movements can be used to indicate the same selection. A number of different movements can be associated with an indicated action as shown in FIG. 6. A "centered" position 610 of a portable media device 600 can indicate playing a "current" selection 604, such as a "current" track within a particular album. The user can displace the portable media device 600 along a left/right axis 614 to choose a "previous" selection 602 or a "next" selection 606. In this case, a "left" position 608 along the axis 614 can indicate "previous" 601 and a "right" position 612 along the axis 614 can indicate "next" 606. Thus a sensor within the portable media device 600 can sense position, and the processor can change a selection according to sensed position. Alternatively a sensor in the portable media device 600 can sense a movement, such as a linear acceleration, along a direction, rather than a position, with a "right" movement 618 indicating "next" 606 and a "left" movement 616 indicating "previous". In addition to sensing position and linear acceleration, a sensor can detect a change in orientation or an angular acceleration. A counter-clockwise rotation 620 can indicate "previous" 602, while a clockwise rotation 622 can indicate next. Thus, as shown in FIG. 6, multiple sensed movements of a device can map to a particular action.

Figure 7A:
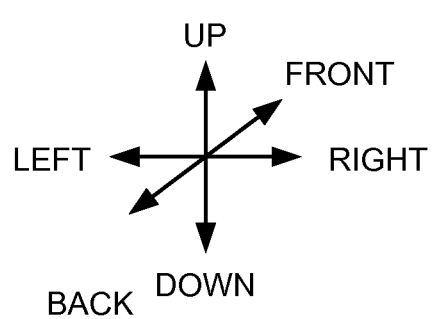
FIGS. 7A, 7B and 7C illustrate three different sets of identifiers that indicate directions with respect to a central reference point in a coordinate system.
Figure 7B:
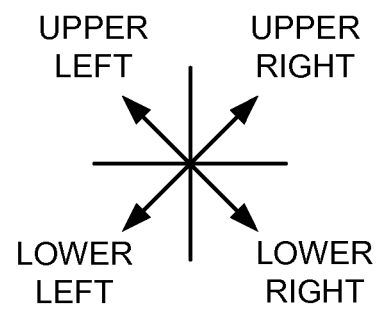
Figure 7C:
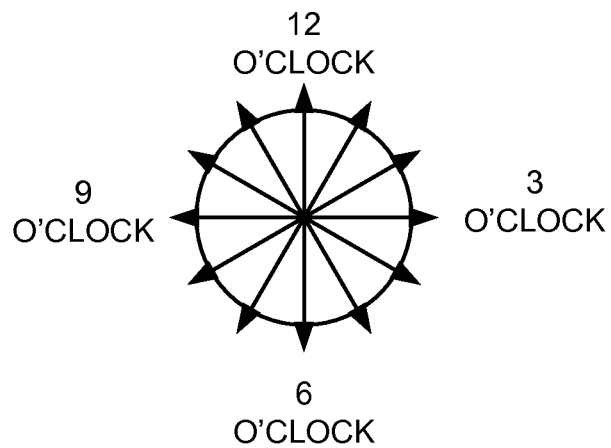

An audio user interface can use several different spatial axis direction groupings by which to present menu selections or to sense movements about a "central" position. A spatial axis grouping as shown in FIG. 7A can be used for detecting motion of a portable media device, with the "central" position being a current "resting" location of the device. Each of the six different directions in FIG. 7A can be associated with a different action, and those actions can depend on a "current" mode of the device. For example, when using a portable media device 702 in a "playback" mode, the "up" direction could present "play" 706, the down direction "pause" 708, the left direction "louder" 710, the right direction "softer" 712. In addition, the forward direction can represent "fast forward" and the back direction "reverse". With binaural reproduction through a headset 704, the menu items can be convincingly presented at distinct locations around the user. A spatial axis grouping as shown in FIG. 7B can be used for browsing a set of menu items when using the portable media device in a "browse" mode, as described earlier for FIGS. 5A and 5B. The spatial grouping of FIG. 7B essentially divides a space into four quadrants, which matches well to presenting multiple menu items at distinguishable spatial locations (for example through audio spatialization in a vertical plane in front of the user). An alternative spatial grouping as shown in FIG. 7C can also be used to present a set of menu items arrayed in a horizontal plane around a user (top view with user at the center).

Figure 8A:
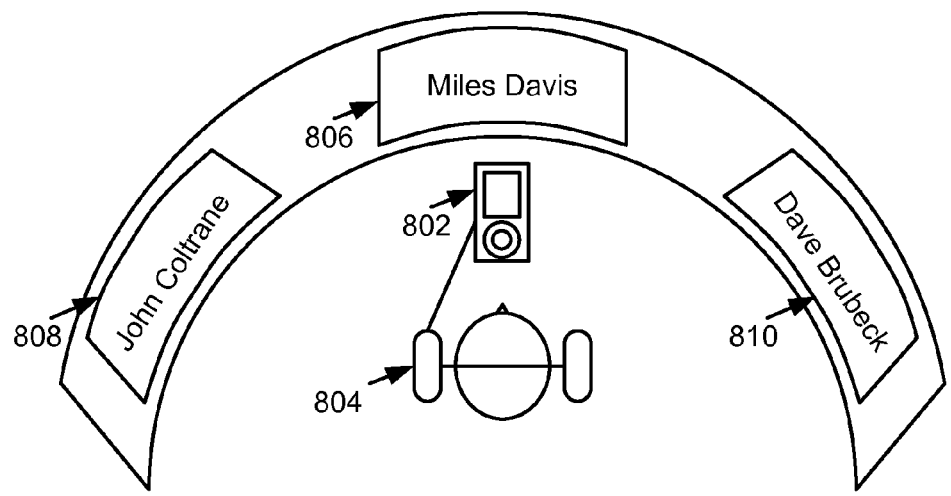
FIGS. 8A and 8B illustrate two sets of menu item selections of an audio user interface presented in two different aural spatializations about a user.

FIG. 8A illustrates an audio user interface presented by a portable media device 802 through a stereo (binaural) headset 804 where the set of menu items are arrayed spatially in an arc about a user (top view). Three selections of jazz genre music can be presented either sequentially or simultaneously to the user. A segment of Miles Davis music 806 can be presented centrally and "in front" of the user, while a segment of John Coltrane music 808 can be presented to the left of the user and a segment of Dave Brubeck music 810 presented to the right of the user. Audio processing algorithms can be applied to the "left" 808 music and "right" 810 music so that they appear more distant (e.g. quieter) and "off center" compared to the "center" music 806. Changing the position of the device or specific movements of the device can also alter the combined sound from all three locations presented to the user. For example moving the device from left to center to right can cause each of the directionally indicated music to play louder while the others played softer. Alternatively, one can consider the arrangement shown in FIG. 8A as an aural form of a visual user interface known as "cover flow" used in Apple products such as the iPod. While FIG. 8A illustrates only three menu selections at left, center and right positions, additional menu selections can also exist off stage. In one embodiment the menu selections could continue in the right and left directions continuously, with the user able to shift the center position to a present a new menu selection by a particular movement of the portable media device 802. The audio presented to the user when switching between selections at the center position can be processed to include audible "movement" that emulates a shifting out to one side of the old selection and a shifting in from the other side of the new selection. Numerous audible sound effects can be realized using a processor in the portable media device 802. By a separate gesture, such as depressing a button on the portable media device 802 or by shaking the portable media device 802, the user can select one of the presented menu items. By so selecting, the user can change levels in a hierarchical search, for example, from searching within a genre to searching within a particular artist, or the user can begin playback of a particular album or song. Thus, by moving the portable media device 802 in one or more spatial dimensions, the user can browse a database of stored media through an array of menu item selections presented aurally by means of an audio user interface.

Figure 8B:
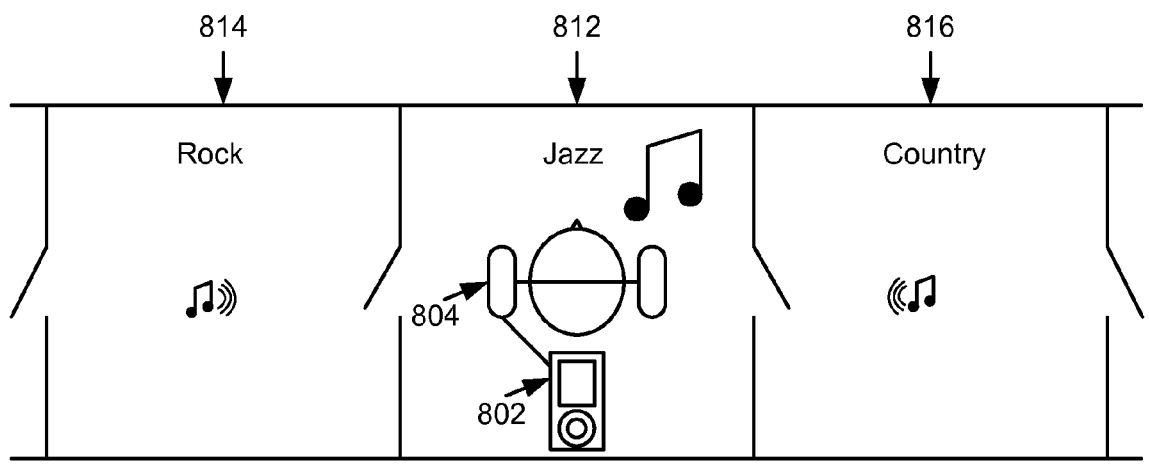

FIG. 8B illustrates another embodiment of an audio user interface presented by the portable media device 802 to a user through the headset 804 (top view). A set of menu selections can be spatially processed in the portable media device 802 to resemble sitting within a series of connected rooms 812, 814, 816. A segment of jazz music can be presented as the current selection with the user seeming to be situated within a "jazz" room 812, while simultaneously the user can hear a segment of rock music emanating from an adjacent room 814 to the left and a segment of country music emanating from an adjacent room 816 to the right. A processor in the portable media device 802 can spatially process the music to diminish the volume and "occlude" the sounds from the adjacent "rooms" to represent distance from the user and intervening room walls. Moving the device 802 to the left or right can cause the sound field to shift appropriately (for example the user can seem to switch position to adjacent rooms).

Figure 9A:
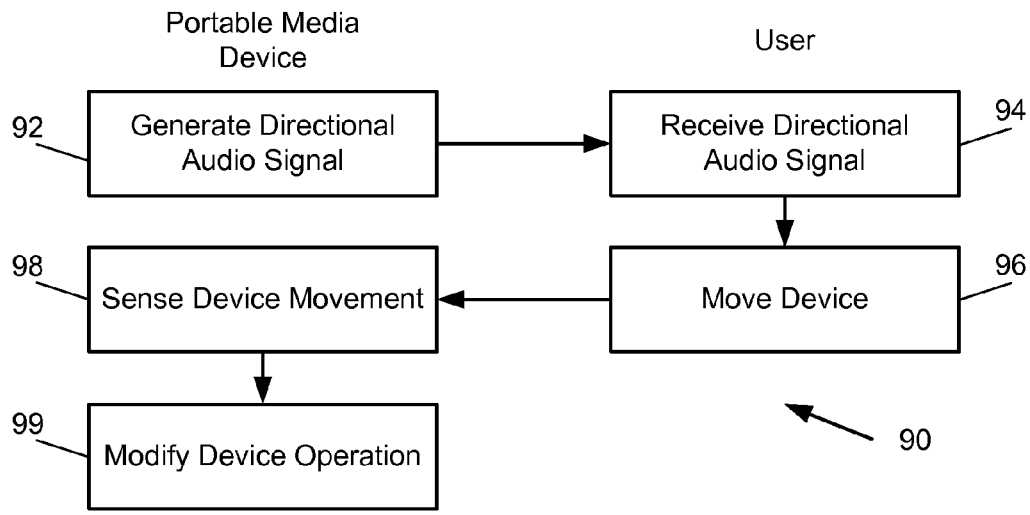
FIGS. 9A and 9B illustrates embodiments of a method for providing an interactive audio user interface between a portable media device and a user.

FIG. 9A illustrates an embodiment of a method 90 for controlling a portable media device through a directional audio interface. In step 92, a portable media device generates a directional audio signal that is received by a user in step 94. In an embodiment, the directional audio signal can contain a number of audio control nodes 16 that appear to the user to emanate from different spatial locations around the user as illustrated in FIG. 1. In response to the received directional audio signal, the user moves the portable media device in step 96. In an embodiment, the user can move the device toward one or more of the perceived audio control nodes 16 in response to the audio signal. The portable media device can sense the device movement in step 98 and can modify the portable media device operation in response to the sensed movement in step 99.

Figure 9B:
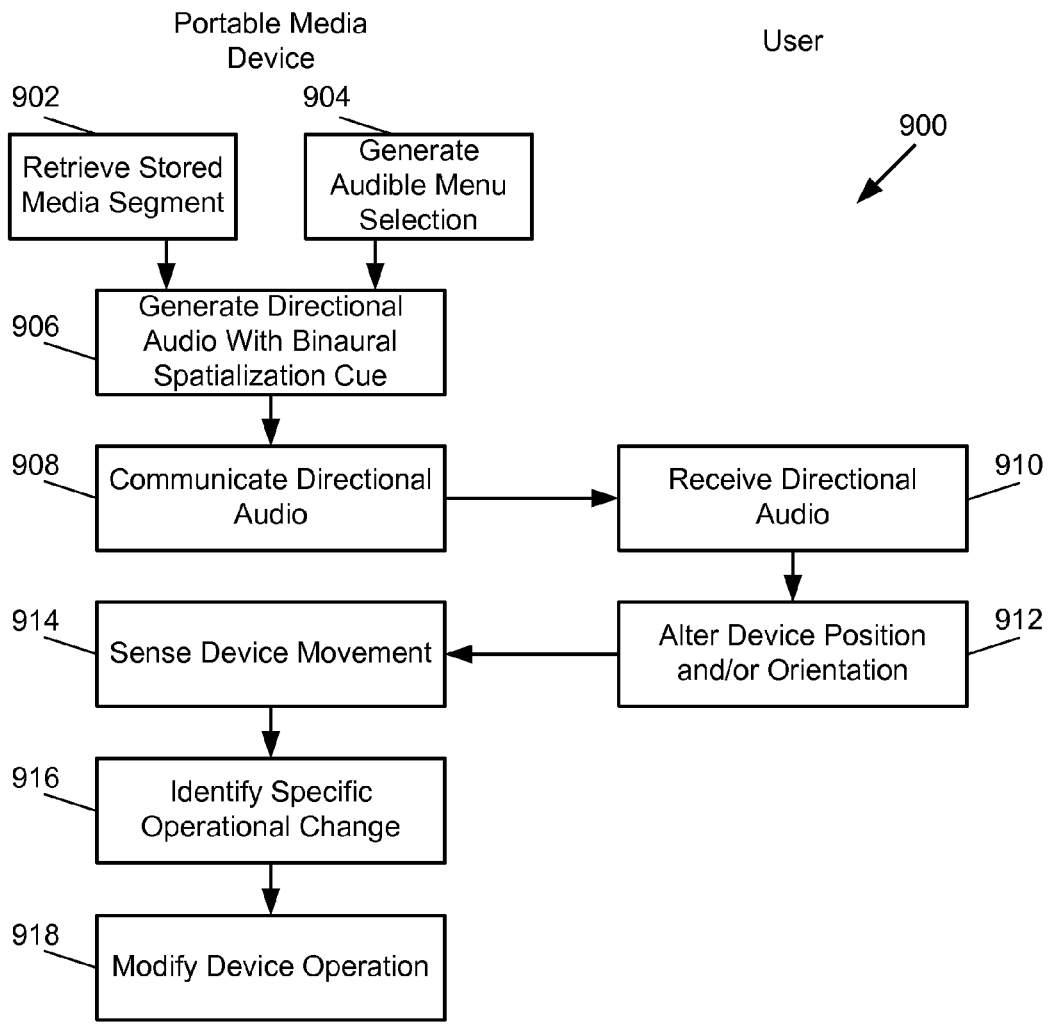

FIG. 9B expands on the method of FIG. 9A and outlines a method 900 for providing an audio user interface to a user of a portable media device. In step 902 a stored media segment in the portable media device is retrieved from storage within the portable media device. In step 904, an audible menu selection is generated, such as a text to speech conversion, in the portable media device. Step 904 is optional but can be useful to identify a menu item selection, such as "louder", "softer", "play" or "pause" to be associated with a movement direction. The generated menu item selection from step 904 can also be the name of a genre, artist or album for example that can be combined with retrieved media or reproduced alone. In step 906, directional audio is generated, using either the retrieved media segment or the generated menu selection or both. The generated directional audio includes a binaural spatialization cue, which can provide the user one or more directions to associate with menu items or media segments. In step 908 the generated directional audio is communicated to the user who receives the directional audio in step 910. In response to the received directional audio, in step 912, the user alters the portable media device's position and/or its orientation. In step 914, the portable media device senses the device movement, and, in step 916, the portable media device identifies a specific operational change indicated by the sensed device movement. In step 918, the portable media device modifies its operation based on the identified specific operational change. In some embodiments, the directional audio generated in step 906 can include multiple retrieved segments of stored media (or multiple audible menu selections) that are combined and presented simultaneously or sequentially. The generated audible menu selection can include any of a number of stored tags associated with the stored media, such as a genre category title or a particular stored media selection title. In some embodiments, binaural spatialization cues in the generated directional audio can include modifying the retrieved media segments and/or the audible menu selections to emulate sound reproduction from a particular spatial direction. The user can respond to the directional audio by moving the portable media device, and the portable media device can sense the movement and associate that movement with a specific operational change. The portable media device can be used in a variety of modes, such as a browsing mode, in which moving the device provides a sampling of the stored media, or a playback mode, in which moving the device controls playback properties applied to retrieved media.

Figure 10:
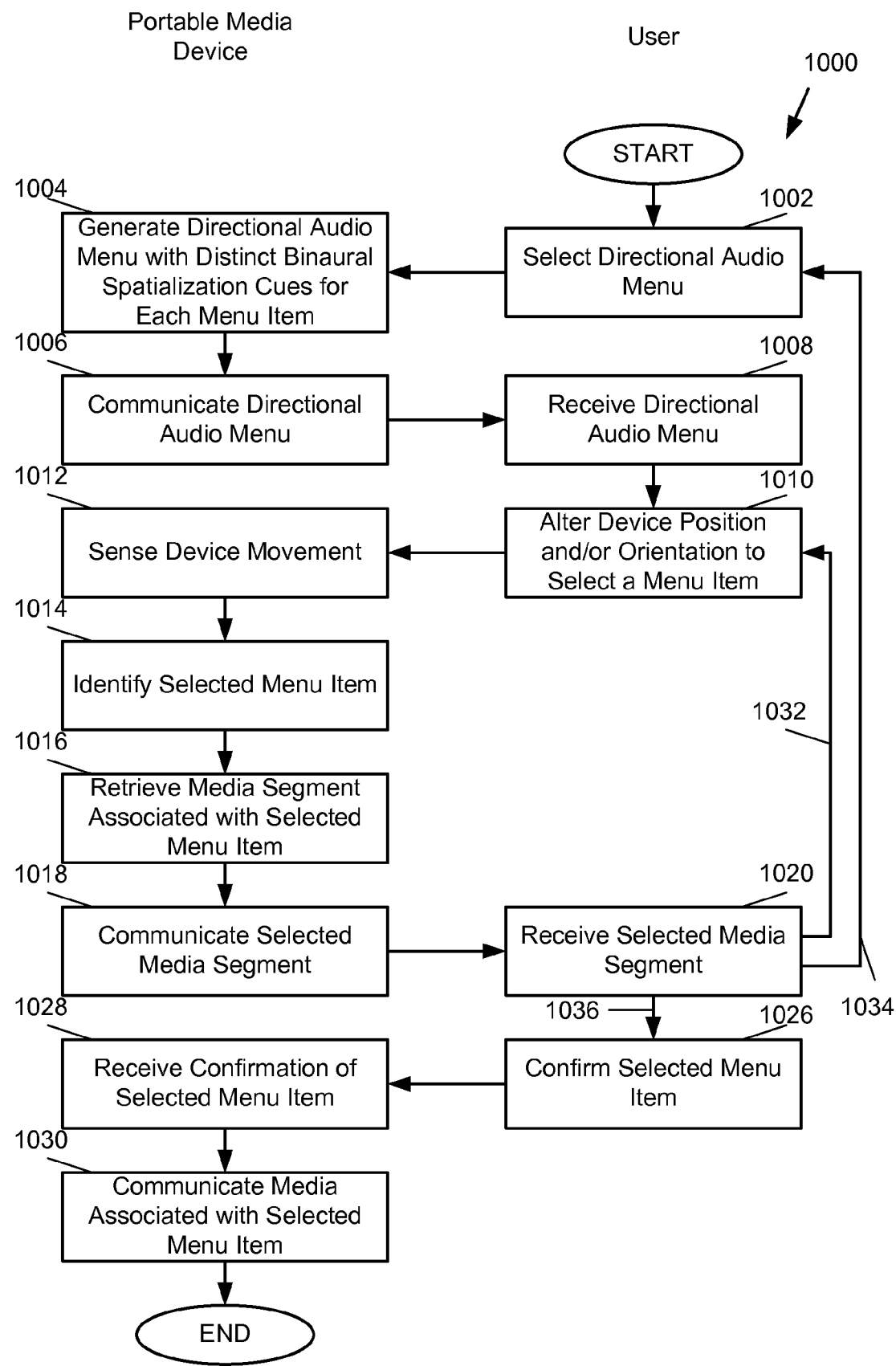
FIG. 10 illustrates a second embodiment of a method for providing an interactive audio user interface between a portable media device and a user.

FIG. 10 illustrates a method 1000 for providing an audio user interface enabling a user to browse and select among a set of media stored in a portable media device. In step 1002 the user selects a directional audio menu, such as a particular database of stored media (or a subcategory within the database) in a portable media device. In step 1004, the portable media device generates a directional audio menu with distinct binaural spatialization cues for each menu item. In step 1006, the directional audio menu is communicated to the user who receives the directional audio menu in step 1008. As described earlier, the portable media device can present the set of menu items in the directional audio menu simultaneously or sequentially, each menu item appearing to emanate from a distinct location. In step 1010, the user alters the position and/or the orientation of the portable media device to select one of the menu items presented in the directional audio menu. In step 1012, the portable media device senses the device movement and in step 1014 identifies one of the menu items selected by the user. In step 1016 the portable media device retrieves a media segment associated with the selected menu item and communicates the retrieved media segment in step 1018 to the user. In some embodiments, the retrieved media segment can a sample of stored media (such as a snippet of a song), in other embodiments the media segment can be a stored text (such as a genre or song title) which can be transformed into audible speech.

In step 1020 the user receives the selected media segment and responds to the received media segment by taking one of three different paths. Taking a first path 1032, the user re-enters step 1010 by altering the device position and/or orientation again to select another menu item than that currently selected, in which case the portable media device senses the movement again, identifies the new selection and presents it to the user. By repeating this circular path from step 1010 to 1020, the user can browse through a variety of menu items by moving the portable media device about a virtual space communicated as a directional audio menu. Taking a second path 1034, the user re-enters step 1002, for example by selecting a different directional audio menu to browse rather than the currently presented menu. The second path 1034 enables the user to move to a higher level in a hierarchically stored media database, such as moving from browsing a set of artists within a genre back to browsing a set of genres. Alternatively taking a third path 1036, the user confirms the selected menu item in step 1026, which the portable media device receives in step 1028. The portable media device then communicates the stored media associated with the selected menu item in step 1030. The third path 1036 enables the user to move to a deeper level in the stored media database, such as from browsing a set of artists to browsing a set of albums of a particular artist. In some embodiments, step 1030 can result in the user entering a playback mode, where the selected menu item begins playing in its entirety (rather than as a limited time segment that can be used in the browsing mode).

Figure 11:
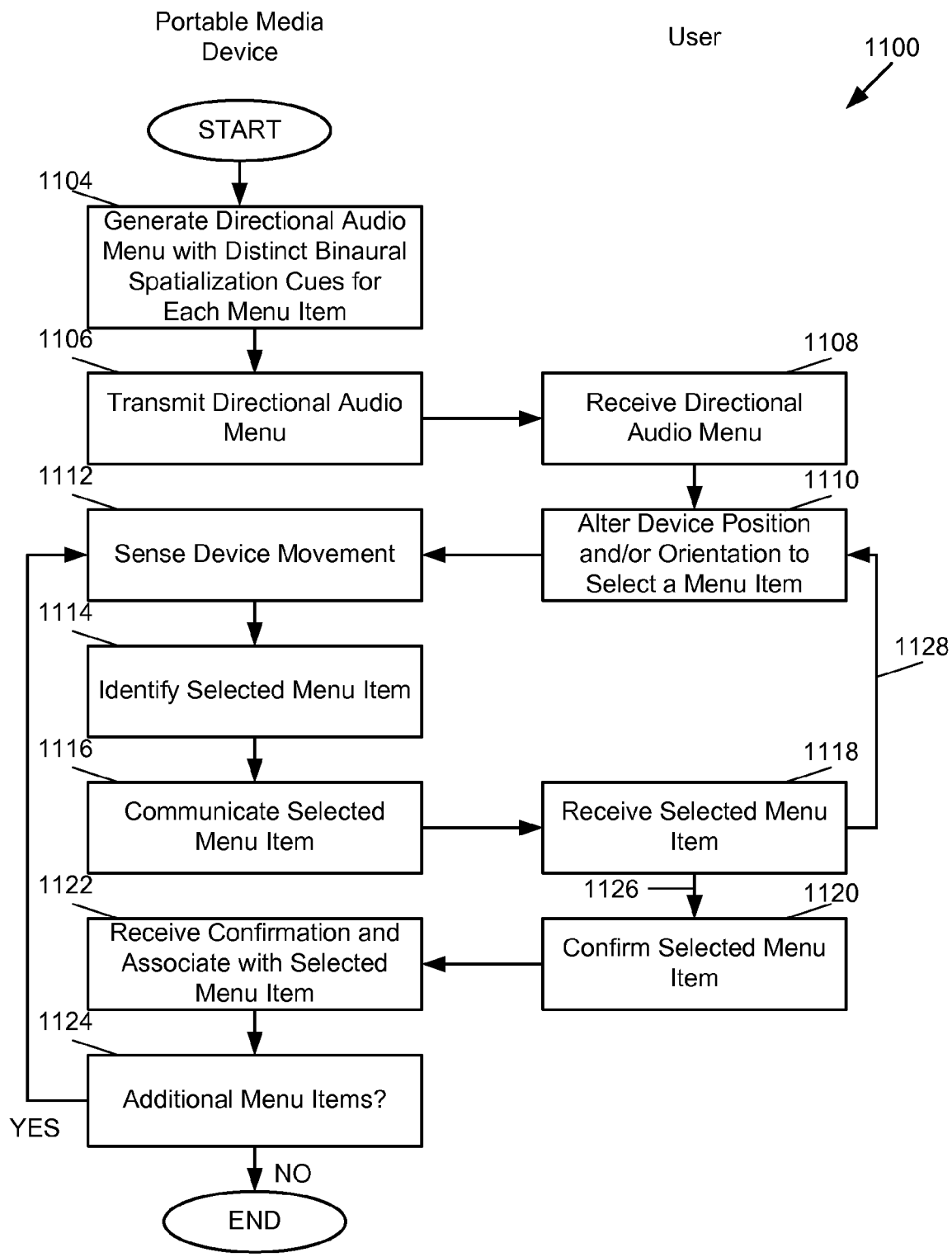
FIG. 11 illustrates an embodiment of a method to train an interactive audio user interface between a portable media device and a user.

A directional audio interface as described herein can be used without training a user, because the portable media device provides direct audio feedback to the user during its use. The audio feedback provides a form of self correction for the user to adjust the position or orientation of the device to select a particular menu item. In some embodiments, it may be desired to train the directional audio interface to a set of gestures customized for a particular user (or conversely to train the user to learn a particular set of gestures). FIG. 11 illustrates a method 1100 for training a directional audio interface of a portable media device. In step 1104, a portable media device generates a directional audio menu with distinct spatialization cues for each menu item. In step 1106 the portable media device transmits the directional audio menu to the user. The menu items can be transmitted simultaneously or sequentially. In step 1108 the user receives the directional audio menu, and in step 1110 the user moves the portable media device to a particular position or orientation to select a menu item in the received directional audio menu. In step 1112, the portable media device senses the movement and in step 1114 identifies a selected menu item. In step 1116 the portable media device communicates the selected menu item to the user who receives the selected menu item in step 1118. The user can respond to the received selected menu item along two different paths. Along a first path 1126, the user confirms the selected menu item in step 1120, such as by depressing a button on the device or executing a distinct gesture. The portable media device receives the confirmation in step 1122 and associates the selected menu item with the most recent sensed device movement. In step 1124, the portable media device determines if there are additional menu items that have not been confirmed and returns to sensing device movements until all menu items have been confirmed. Along the second path 1128, the user moves the device to a different position thereby causing the device to sense a new movement and present a newly selected menu item. Without confirmation, the user can cause the portable media device to cycle through the various menu item selections available in the audible menu interface by moving the portable media device to different positions (or orientations). As an example, the portable media device can transmit an audio user interface containing three menu item selections A, B and C, each menu item presented aurally with a distinct spatial location in step 1106. The user can move the device to various positions (or orientations) and receive feedback from the portable media device of each menu item selection A, B or C sensed for each position (or orientation). The user can confirm a menu item selection A, B or C individually at each sensed location thereby associating a position (or orientation) with a particular menu item.

In some embodiments, the portable media device can include a visual display that can supplement the audio user interface presented to the user. The visual display can mirror the menu items presented to the user as well as show a selected menu item when the user moves the device. For example, the visual display can present a graphical representation of a "cover flow" of albums, while the audio user interface simultaneously presents an aural representation of the same "cover flow." In another embodiment, the visual display can illustrate positions or gestures of the portable media device that the audio user interface can associate with particular menu items.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line used to fabricate thermoplastic molded parts. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method comprising:
   transmitting, by a processor of a portable device, a directional audio signal to a user, the directional audio signal generated by the portable device and associated with a spatial location relative to the user, the directional audio signal transmitted to the user independent of a physical location of the user;
   sensing, by a sensor of the portable device, movement of the portable device in a direction of a first spatial location with which the directional audio signal is associated, wherein the first spatial location direction of the sensed movement is one of a plurality of potential directions of sensed movement each of which corresponds to a specific modification in an operation performed by the portable device;
   identifying, by the processor, a modification of the operation currently being performed by the portable device that corresponds to the first spatial location direction of the sensed movement; and
   modifying, by the processor, an operation being currently performed by the portable device in accordance with the identified modification, at least in part, by
      adjusting the directional audio signal to a different spatial location around the user, and updating a visual display of the portable device based on the sensed movement of the portable device, wherein the updating the visual display comprises: updating a graphical user interface presented on the visual display, wherein the graphical user interface includes at least a list of selectable items each corresponding to content stored in the portable device.

2. The method of claim 1 wherein the sensor is arranged to detect at least a change in position of the portable device with respect to the user or a change in orientation of the portable device or an acceleration of the portable device.

3. The method of claim 2 wherein the directional audio signal includes an audible segment of stored media and a stored media binaural spatialization cue representing an audio direction perceived by the user to be associated with the audible segment.

4. The method of claim 2 wherein the directional audio signal includes an audible menu selection and an audible menu selection binaural spatialization cue representing an audio direction perceived by the user to be associated with the audible menu selection.

5. The method as recited in claim 1, wherein the modifying the operation of the portable device in accordance with the sensed movement comprises: selecting one of the list of selectable items.

6. A portable device arranged to provide an audio user interface to a user of the portable device, the portable device comprising:
    a visual display;
    a processor configured to generate a directional audio signal;
    an audio output circuit configured to communicate the directional audio signal to the user of the portable device at a spatial location relative to the user and independent of a location of the user; and
    a sensor configured to sense a movement of the portable device in a direction of a first spatial location at which the directional audio signal is communicated, the movement generated by the user in response to the directional audio signal, wherein the first spatial location direction of the sensed movement is one of a plurality of potential directions of sensed movement each of which corresponds to a specific operational change in the portable device,
    wherein the processor is further configured to
        identify a specific operational change that corresponds to the first spatial location direction of the sensed movement and
        modify an operation being currently performed by the portable device in accordance with the identified specific operational change, at least in part, by
            adjusting the directional audio signal to a different spatial location around the user, and
            updating the visual display based on the sensed movement of the portable device, wherein the updating of the visual display comprises updating a graphical user interface resented on the visual display, wherein the graphical user interface includes at least a list of selectable items each corresponding to content stored in the portable device.

7. The portable device of claim 6 wherein the sensor is a sensor arranged to detect a change in position of the portable device in relation to user of the portable device, an orientation change, and an acceleration of the portable device.

8. The portable device of claim 6 further including: a storage unit configured to store media, wherein the directional audio signal includes an audible segment of media retrieved from the storage unit.

9. The portable device of claim 6 wherein the processor is configured to generate an audible menu selection and a binaural spatialization cue representing an associated audio direction included in the directional audio signal.

10. The portable device of claim 9 wherein the binaural spatialization cue includes an audible segment of stored media or an audible menu selection altered by the processor to audibly emanate from the associated audio direction.

11. A method for updating an audio user interface of a portable device having a processor and a directional audio interface, the method comprising:
    transmitting a directional audio menu including at least one menu item selection to a user of the portable device, the at least one menu item transmitted to a spatial location relative to the user and independent of the location of the user;
    sensing a movement of the portable device in a direction of a first spatial location in response to the transmitted directional audio menu;
    identifying a first menu item selection in the directional audio menu based on the sensed movement in the direction of the first spatial location;
    associating the identified first menu item selection in the directional audio menu with the sensed movement in the direction of the first spatial location;
    communicating the identified first menu item selection to the user, and updating a visual display of the portable device based on the identified first menu item selection;
    identifying a hierarchy level of the identified menu item selection; and
    transmitting a new directional audio menu including at least one new menu item selection to a user of the portable device, the at least one new menu item transmitted to another spatial location relative to the user, wherein the new directional audio menu and the at least one new menu item selection are associated with the identified hierarchy level.

12. The method of claim 11 further comprising receiving a confirmation of the first menu item selection from the user.

13. The method of claim 11 wherein each menu item selection in the directional audio menu includes a distinct binaural spatialization cue representing an associated audio direction.

14. The method of claim 13 wherein the distinct binaural spatialization cue includes the menu item selection altered to audibly emanate from the associated audio direction.

15. The method of claim 11 wherein the portable device includes a sensor arranged to detect a change in position, an orientation change and an acceleration of the portable device.

16. A portable device comprising:
    a visual display;
    a processor configured to generate a directional audio menu including at least one menu item selection;
    an audio output circuit configured to transmit the directional audio menu to a user of the portable device, such that the at least one menu item is transmitted to a spatial location relative to the user and independent of the location of the user; and
    a sensor arranged to sense a movement of the portable device in a direction of a first spatial location in response to the transmitted directional audio menu, wherein the processor is further configured to
identify a first menu item selection in the directional audio menu based on the sensed movement in the direction of the first spatial location, and
associate the identified first menu item selection in the directional audio menu with the sensed movement in the direction of the first spatial location,
wherein the audio output circuit is further configured to communicate the identified first menu item selection to the user,
wherein the processor is further configured to
update the visual display of the portable device based on the identified first menu item selection, and
identify a hierarchy level of the identified menu item selection, and
wherein the audio output circuit is further configured to transmit a new directional audio menu including at least one new menu item selection to a user of the portable device, the at least one new menu item transmitted to another spatial location relative to the user, wherein the new directional audio menu and the at least one new menu item selection are associated with the identified hierarchy level.

17. The portable device of claim 16, wherein the processor is further configured to receive a confirmation of the first menu item selection from the user.

18. The portable device of claim 16 wherein each menu item selection in the directional audio menu includes a distinct binaural spatialization cue representing an associated audio direction.

19. The portable device of claim 18 wherein the distinct binaural spatialization cue includes the menu item selection altered to audibly emanate from the associated audio direction.

20. The portable device of claim 16 wherein the sensor is arranged to detect a change in position, an orientation change and an acceleration of the portable device.

* * * * *

UNITED STATES PATENT AND TRADEMARK OFFICE
CERTIFICATE OF CORRECTION

PATENT NO. : 8,923,995 B2
APPLICATION NO. : 12/645051
DATED : December 30, 2014
INVENTOR(S) : Aram Lindahl and Richard M. Powell Page 1 of 1

It is certified that error appears in the above-identified patent and that said Letters Patent is hereby corrected as shown below:

In the Claims

Column 13, line 60, in Claim 6, delete "resented" and insert -- presented -- therefor.

Signed and Sealed this
Nineteenth Day of May, 2015

Michelle K. Lee
*Director of the United States Patent and Trademark Office*